US010694320B2

(12) United States Patent
Guegel et al.

(10) Patent No.: US 10,694,320 B2
(45) Date of Patent: Jun. 23, 2020

(54) METHODS AND APPARATUS TO ENABLE DEVICE BASED GEO-LOCATION MESSAGES

(71) Applicant: Neustar, Inc., Sterling, VA (US)

(72) Inventors: Roland Guegel, Sterling, VA (US); Deepak Sonar, Sterling, VA (US); Ralph Holmes, Sterling, VA (US); Adam Campbell, Sterling, VA (US)

(73) Assignee: Neustar, Inc., Sterling, VA (US)

( * ) Notice: Subject to any disclaimer, the term of this patent is extended or adjusted under 35 U.S.C. 154(b) by 0 days.

(21) Appl. No.: 16/362,591

(22) Filed: Mar. 22, 2019

(65) Prior Publication Data

US 2019/0297453 A1  Sep. 26, 2019

Related U.S. Application Data

(60) Provisional application No. 62/693,602, filed on Jul. 3, 2018, provisional application No. 62/647,351, filed on Mar. 23, 2018.

(51) Int. Cl.
*H04W 24/00* (2009.01)
*H04W 4/021* (2018.01)
*H04W 4/06* (2009.01)
*H04W 4/12* (2009.01)

(52) U.S. Cl.
CPC ............ *H04W 4/021* (2013.01); *H04W 4/06* (2013.01); *H04W 4/12* (2013.01)

(58) Field of Classification Search
CPC .......... H04W 4/021; H04W 4/12; H04W 4/06
USPC .................................................... 455/456.1
See application file for complete search history.

(56) References Cited

U.S. PATENT DOCUMENTS

| 8,275,347 | B2* | 9/2012 | Sennett | H04W 4/90 455/404.1 |
| 8,594,704 | B2* | 11/2013 | Karabinis | H04B 7/18513 455/456.3 |
| 9,940,632 | B2* | 4/2018 | Harb | G06F 16/60 |
| 2008/0177847 | A1* | 7/2008 | Wilson | G06F 16/29 709/206 |

(Continued)

FOREIGN PATENT DOCUMENTS

WO  WO 2017/076463 A1  5/2017

OTHER PUBLICATIONS

International Search Report dated Jun. 19, 2019 for Appl. No. PCT/US2019/023762, 2 pages.

(Continued)

*Primary Examiner* — Amancio Gonzalez
(74) *Attorney, Agent, or Firm* — Sterne, Kessler, Goldstein & Fox P.L.L.C.

(57) ABSTRACT

The disclosed systems, methods and apparatus enable alert messaging systems to send geographic location information with a geo-targeted message to end user wireless devices. The disclosed technology can be used to generate a plurality of messages where payload of a first message can include a message content, and where a payload of one or more additional messages can includes compressed location information. The user devices receiving the plurality of generated messages can process the compressed location information to determine whether the content of the received message should be displayed.

22 Claims, 10 Drawing Sheets

(56) References Cited

U.S. PATENT DOCUMENTS

| | | | |
|---|---|---|---|
| 2010/0241488 A1* | 9/2010 | Jacobson | G06Q 30/0205 |
| | | | 705/7.34 |
| 2012/0201125 A1 | 8/2012 | Bienfait et al. | |
| 2013/0125219 A1 | 5/2013 | Raleigh | |
| 2013/0308781 A1 | 11/2013 | Kristiansson et al. | |
| 2015/0049745 A1 | 2/2015 | Han et al. | |
| 2016/0088446 A1 | 3/2016 | Stephens et al. | |
| 2016/0259032 A1 | 9/2016 | Hehn et al. | |
| 2018/0189800 A1* | 7/2018 | Harb | G06F 16/60 |

OTHER PUBLICATIONS

Written Opinion dated Jun. 19, 2019 for Appl. No. PCT/US2019/023762, 5 pages.

* cited by examiner

METHODS AND APPARATUS TO ENABLE DEVICE BASED GEO-LOCATION MESSAGES

CROSS REFERENCE TO RELATED APPLICATIONS

This patent document claims the benefit of priority of U.S. Provisional Patent Application No. 62/647,351, entitled "METHODS AND APPARATUS TO ENABLE DEVICE BASED GEO-LOCATION MESSAGES," filed on Mar. 23, 2018. This patent document also claims the benefit of priority of U.S. Provisional Patent Application No. 62/693,602, entitled "METHODS AND APPARATUS TO ENABLE DEVICE BASED GEO-LOCATION MESSAGES," filed on Jul. 3, 2018. The entire contents of the above referenced provisional patent applications are incorporated by reference as a part of this patent document.

TECHNICAL FIELD

This patent document relates to systems, methods, and devices to provide wireless messages based on location information.

BACKGROUND

The Wireless Emergency Alert (WEA) system is a communication system that can display alert messages to wireless devices. Some examples of alert messages provided by the WEA system include AMBER alerts, fire or flood warnings, or tsunami warnings.

In conventional systems, the WEA system may identify cell towers that are in or near impacted areas and display the alert message to all devices that can be reached by the identified cell towers. In particular, these cell towers are configured to broadcast the alert message, and any device that receives the broadcasted message is configured to receive and then display the message.

However, the broadcasted alert message is also received by wireless devices that are located adjacent to, but not in, the impacted areas. For example, a fire evacuation message broadcasted by several cell towers near a forest fire may be received by, and displayed on, wireless devices that are located far (i.e., safe) from the forest fire, but still reachable by the cell towers.

SUMMARY

The technologies described in this patent document overcome drawbacks of conventional WEA systems related to broadcast alert messaging. The disclosed systems are capable of displaying alert messages to devices located in certain geographical areas. The disclosed systems are capable of providing wireless devices with a message as well as data indicating geographical areas in which the message is relevant. The wireless device receiving the message determines whether the device is within one of the indicated geographical areas (e.g., using a GPS). An alert message is displayed if the device is determined to be in one of the defined geographical areas. The disclosed systems are further capable of providing the data indicating geographical areas even when such data exceeds size limits defined by Common Alert Protocol (CAP).

This patent document describes techniques to generate and send wireless messages to one or more user devices based on a geo-location. For example, a method is disclosed for generating alert messaging by receiving an alert message that includes message content and geographic area information, compressing the geographic area information to obtain compressed location information, and generating a plurality of messages by separating information included in the alert message. The plurality of messages includes a first message and a second message, where the first message includes (i) the geographic area information and (ii) a first payload that includes a first unique identifier and the message content, and the second message includes (i) the geographic area information and (ii) a second payload that includes a second unique identifier and the compressed location information. The first unique identifier and the second unique identifier facilitate a reassembling of the first message and the second message by a user device. The method also includes transmitting the plurality of messages to be broadcast to a plurality of user devices.

Another method is disclosed for processing alert messaging. This method comprises receiving, by a user device from a messaging system, a plurality of messages comprising a first message and a second message, where the first message includes a first payload that includes a first unique identifier and a message content, and the second message includes a second payload that includes a second unique identifier and compressed location information, decompressing the compressed location information to obtain geographic area information, determining a location of the user device, and displaying the message content on the user device in response to determining that the location of the user is within the geographic area information.

As another method, alert messaging are processed by receiving, by a user device from a messaging system, a plurality of messages comprising a first message and two or more additional messages, where the first message includes a first payload that includes a first unique identifier and a message content, and each of the two or more additional messages includes a unique identifier and a payload that includes a fragment of compressed location information, combining a plurality of fragments of the compressed location information obtained from each of the two or more additional messages to generate a combined compressed location information, decompressing the combined compressed location information to obtain geographic area information, determining a location of the user device, and displaying the message content on the user device in response to determining that the location of the user is within the geographic area information.

Another method is disclosed for processing alert messaging. The method includes receiving, by a user device from a messaging system, a first message set comprising one or more messages. Each message comprises an identifier that indicates that each message is part of a plurality of messages that yields a complete alert message. Upon determining, based on one or more identifiers of the one or more messages, that the first message set comprises the complete alert message, reassemble the first message. The first message is reassembled by combining the one or more messages of the first message set to obtain the complete alert message, obtaining a message content and geographic area information from the complete alert message, determining a location of the user device, and displaying the message content on the user device in response to determining that the determined location of the user device is within a geographic area identified by the geographic area information.

Another method is disclosed for processing alert messaging. The method includes receiving, by a user device, one or more messages from a messaging system, where each message includes an identifier. Upon determining, based on one or more identifiers of the one or more messages, that the user device is a permitted recipient of the one or more messages, process the one or more messages. The one or more messages are processed by combining the one or more messages to obtain a complete alert message, obtaining a message content and geographic area information from the complete alert message, determining a location of the user device, and displaying the message content on the user device in response to determining that the determined location of the user device is within a geographic area identified by the geographic area information.

Another method is disclosed for processing a plurality of encrypted alert messages. The method includes receiving, by a user device, one or more encrypted messages from a messaging system. Decrypting, using a cryptographic key of the user device, the one or more encrypted messages to obtain one or more messages. Upon determining, based on an authentication of the one or more messages, that the user device is a permitted recipient of the one or more messages, process the one or more messages. The one or more messages are processed by combining the one or more messages to obtain a complete alert message, obtaining a message content and geographic area information from the complete alert message, determining a location of the user device, and displaying the message content on the user device in response to determining that the determined location of the user device is within a geographic area identified by the geographic area information.

In yet another aspect, the above-described methods are embodied in the form of processor-executable code and stored in a computer-readable program medium.

In yet another embodiment, a device that is configured or operable to perform the above-described methods is disclosed.

The above and other aspects and their implementations are described in greater detail in the drawings, the descriptions, and the claims.

DETAILED DESCRIPTION

This patent document describes systems, methods, and apparatus to enable messaging systems such as emergency alert messaging systems or marketing messaging systems to send data indicating one or more geographical areas ("geographic location information") along with a message to end-user wireless devices. As further described in FIG. 1, an example system can reduce the size of the geographic area information and can transmit the geographic area information as part of a plurality of alert messages. This patent document also describes the end-user wireless device that can receive and process the plurality of alert messages including the geographic area information.

Figure 1:
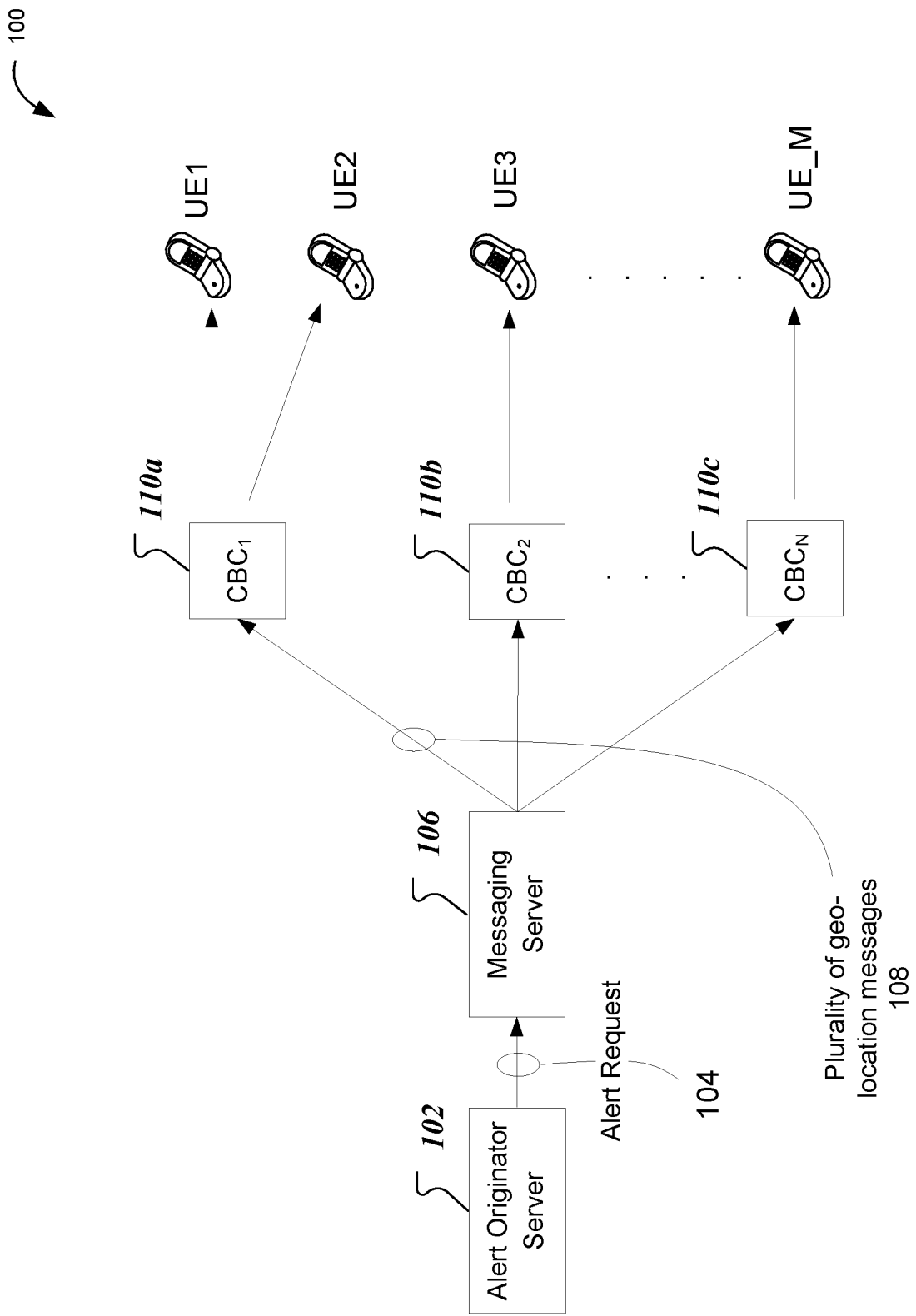
FIG. 1 shows a block diagram of an example of a system to generate device based geo-location messages.

FIG. 1 shows a block diagram of a messaging system 100 for displaying an alert message on devices that are located inside precisely defined geographical areas in accordance with the disclosed embodiments. As mentioned above, the messaging system may include an emergency alert messaging system for sending alert messages such as AMBER alerts, fire or flood warnings, or tsunami warnings. The messaging system may also include marketing messaging systems that provide users with marketing content based on the location of the user's user device. The messaging system includes a downstream subsystem, such as an alert originator system or server 102, that transmits an alert request 104 including message content and data indicating one or more geographic areas ("geographic location information") where the message content has relevance. For example, the message content may include a warning text about a forest fire (e.g., "evacuate now"), and the geographic location information may define areas that are impacted by the forest fire (e.g., 5-mile radius around the forest fire). The geographic location information may include, for example, a polygon location information or a geocode. The polygon location information can describe a shape of an area selected as the geographic location information of an alert request. A geocode can include information such as an area defined by two or more latitudes and two or more longitudes, an area within a radius of a latitude and longitude, a postal area code, and/or a geographic area code. In some embodiments, the alert request can be transmitted using a Common Alerting Protocol (CAP). Additionally, or alternatively, the alert request may be provided to messaging server 106 via a proprietary protocol and/or an application programming interface (API).

The messaging system 100 includes a messaging server 106 that receives the alert request and, based on the received request, generates a plurality of alert messages 108. In some embodiments, messaging server 106 may determine a number of alert messages to generate based on the size of the alert request. The messaging server 106 can generate a first message of the plurality of alert messages with a payload that can include a unique identifier and the message content of the alert request. Further, the first message may optionally include at least a portion of the geographic area data from the generated alert request. The geographic area information can include polygon data or geocode information, or both. At least some portion of the first message (e.g., the geographic area information and/or geocode) can be in an Extensible Markup Language (XML) format.

The messaging server 106 can also generate a second message with a payload that can include a unique identifier and at least a portion of the geographic area information (e.g., a portion not included in the first message). In some embodiments, the unique identifiers of each of the plurality of messages generated by the messaging server can be the same. In these embodiments, the unique identifiers may be used by the receiving device to reassemble the plurality of messages and obtain the complete geographic area data. For example, if a user device receives a first set of two messages related to a flood alert in a first area, and a second set of three messages related to a flash flood warning in a second area that is the same or overlaps with the first area, then the user device can use a first unique identifier included in the two messages of the first set to distinguish from the second unique identifier included in the three messages of the second set. In some other embodiments, each of the plurality of messages generated by the messaging server can include a value that represents a group of messages that are related to or associated with each other.

In some embodiments, the geographic area data may be compressed before inclusion in one or more alert messages. The messaging server 106 retrieves the geographic area information from the alert request and applies a compression algorithm to reduce the size of the geographic area information. In some embodiments, the messaging server 106 can add the compressed location information in the payload of one alert message. In some other embodiments, as further explained below, the messaging server 106 can split and add the compressed location information in the payload of a plurality of alert messages. In some embodiments, the length of the location information, even when compressed, can often exceed the total payload size of a single message used in a WEA system. Thus, a benefit of compressing the location information is that it can reduce the size the location information to allow the messaging system to include the compressed location information in a fewer number of alert messages.

In some embodiments, a messaging server 106 can generate more than one message with unique identifiers if the messaging server 106 determines that a length of a compressed geographic area information is greater than the payload size of the second message. For example, if a messaging server 106 determines that a compressed geographic area information can be included in the content field of two messages, then the messaging server 106 divides or separates the compressed geographic area information into two fragments and each fragment can be separately included in the payload of the second message and the third message. The length of each fragment can be less than or equal to the length of the payload field of the messages. The second message and any additional messages can also include XML formatted information that can include the original geographic area information from the alert request. The geographic area information can include polygon data or geocode information, or both. In some embodiments, each message generated by the messaging server 106 includes information about a total number of messages generated by the messaging server 106 from the generated alert message. In some embodiments, an identifier combining both the unique identifier and the information about a total number of messages may be generated and included in the alert messages. The messaging server 106 can be either a single server or a plurality of servers that perform the various operations described in this patent document. One benefit of the exemplary system shown in FIG. 1 is that it can operate within downstream and upstream messaging system, leverages compression algorithms, and provides the ability for user devices to correlate or process messages as further explained below.

In some embodiments, each message generated by the messaging server 106 may be in a standard CAP format. Thus, benefits of the disclosed embodiments can be realized using existing infrastructures (e.g., wireless network) that are already capable of transmitting messages in CAP format to end-user devices.

The messaging system includes one or more Cell Broadcast Center (CBC) 110a-110c. The messaging server 106 sends the plurality of messages 108 to one or more CBC 110a-110c to be transmitted to a plurality of user devices UE1 to UE_M. Thus, each CBC receives the plurality of messages 108. Some examples of user devices include a mobile phone, a smartphone, a tablet, a laptop, a desktop, or a wearable device. Each CBC determines one or more cellular or wireless networks (e.g., cell towers) corresponding to the geographic area information provided in each message. The CBC sends to the one or more cellular or wireless networks the plurality of messages with the payload information that are then transmitted by the one or more cellular or wireless networks to the user devices.

The transmission of the plurality of messages can provide the end user device with the information needed to create the targeted location of the alert. Each user device can obtain the location information provided in the payload of the plurality of messages and decompress the geographic area information. In some embodiments, the user device can determine whether a location information is included the first and/or second message or in one or more messages in addition to the second message by evaluating a total number of messages value that can be included in each of the received plurality of messages. As an example, if the value of the total number of messages is four, then the user device can determine that the compressed location information is provided in three messages.

In embodiments where a user device determines that a second message includes all of the compressed location information, then the user device can decompress the compressed location information to obtain geographic area information. In embodiments where a user device determines one or more messages in addition to a second message includes the fragments of the compressed location information, then the user device can combine the fragmented compressed location information to obtain a combined compressed location information. The user device can decompress the combined compressed location information to obtain geographic area information.

Each user device can determine if the current location of the user device is within the area defined by the geographic area information. In some embodiments, a user device can retrieve its location information based on licensed and unlicensed wireless technologies and networks, such as global positioning system (GPS) location information, network triangulation location information, Wi-Fi information, Bluetooth information, or a manual input. By comparing the retrieved location information of the user device with the area defined by the geographic area information, the user device can determine whether the alert message included in the received first message is intended for the user device. Thus, in some embodiments, if the user device determines that the user device is located in an area defined by the geographic area information, then the user device can display the alert message to the user. In some embodiments, a user can have an option to have his or her user device not receive or process the plurality of messages transmitted to the user device. Thus, any alert message transmitted to and received by the user device may be disregarded or not displayed by the user device. Alternatively, in some embodiments, the user can have an option to have his or her user device receive and process the plurality of messages as described in this patent document.

There are several uses for the messaging system described in this patent document. For example, a user device may receive and process the emergency alert messages to determine whether the message content (e.g., flash flood warning—evacuate now!) should be displayed. In another example, a user device may receive and process marketing messages to determine whether the messaging content (e.g., sale at a store) should be displayed. As explained in this patent document, the user device can determine whether a message content should be displayed by comparing its location to the geographic area information received in the messages.

Figure 2:
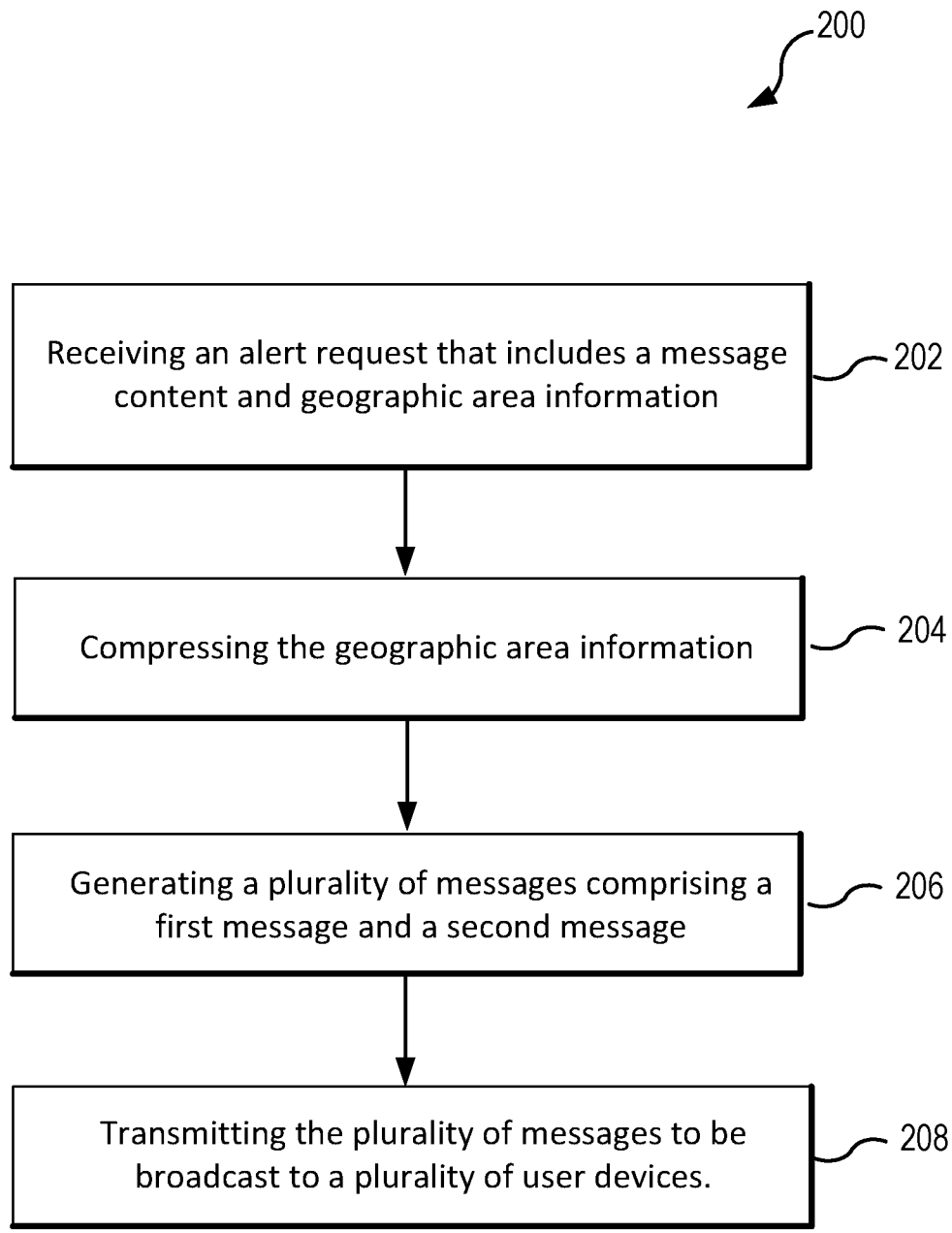
FIG. 2 shows an example of a flowchart for generating alert messaging related to an alert request.

FIG. 2 shows an example of a flowchart for generating alert messaging based on an alert request. At the receiving operation 202, a server receives an alert request that includes a message content and geographic area information. At the compressing operation 204, the server compresses the geographic area information to obtain compressed location information. At the generating operation 206, the server generates a plurality of messages comprising a first message and a second message by separating information included in the alert request. The first message and second message may be received in any order. The first message includes a first payload that includes a first unique identifier and the message content. The second message includes a second payload that includes a second unique identifier and the compressed location information. The first and second messages can also include the geographic area information received as part of the alert request. In some embodiments, the first unique identifier of the first payload can be the same as the second unique identifier of the second payload, which can indicate to a user device that the first message and the second message are related and can be reassembled by the user device. At the transmitting operation 208, the server can transmit the plurality of messages to one or more cellular or wireless networks to broadcast the plurality of messages to a plurality of user devices.

Figure 3:
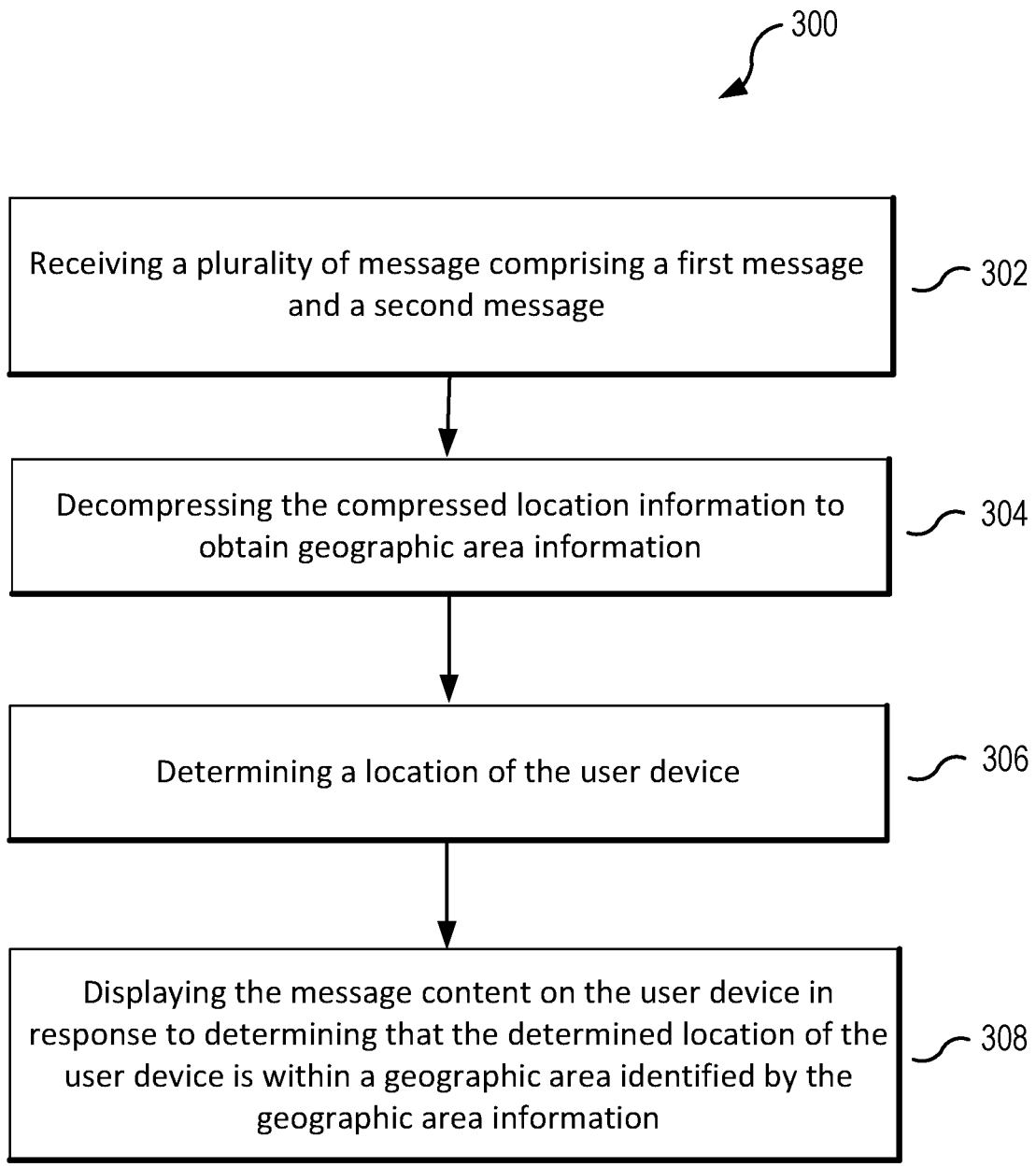
FIG. 3 shows an example of a flowchart for processing alert messaging related to an alert request.

FIG. 3 shows an example of a flowchart for processing alert messaging based on an alert request. At the receiving operation 302, a user device receives from a messaging system a plurality of messages comprising a first message and a second message. The first message includes a first payload that includes a first unique identifier and a message content, and second message includes a second payload that includes a second unique identifier and compressed location information. In some embodiments, the first unique identifier of the first payload can be the same as the second unique identifier of the second payload, which can indicate to the user device that the first message and the second message are related. Thus, prior to the decompressing operation 304, the user device can determine that the received first message and second message are related to each other and are to be reassembled based on the first unique identifier and the second unique identifier. For example, the user device can determine that the received first message and second message are related to each other by determining that the first unique identifier and the second unique identifier are the same. The messaging system may include an emergency alert messaging system or a marketing messaging system.

At the decompressing operation 304, the user device can decompress the compressed location information to obtain geographic area information. At the determining operation 306, the user device determines a location of the user device. At the displaying operation, 308, the user device displays on a screen the message content in response to determining that the determined location of the user device is within a geographic area identified by the geographic area information.

Figure 4:
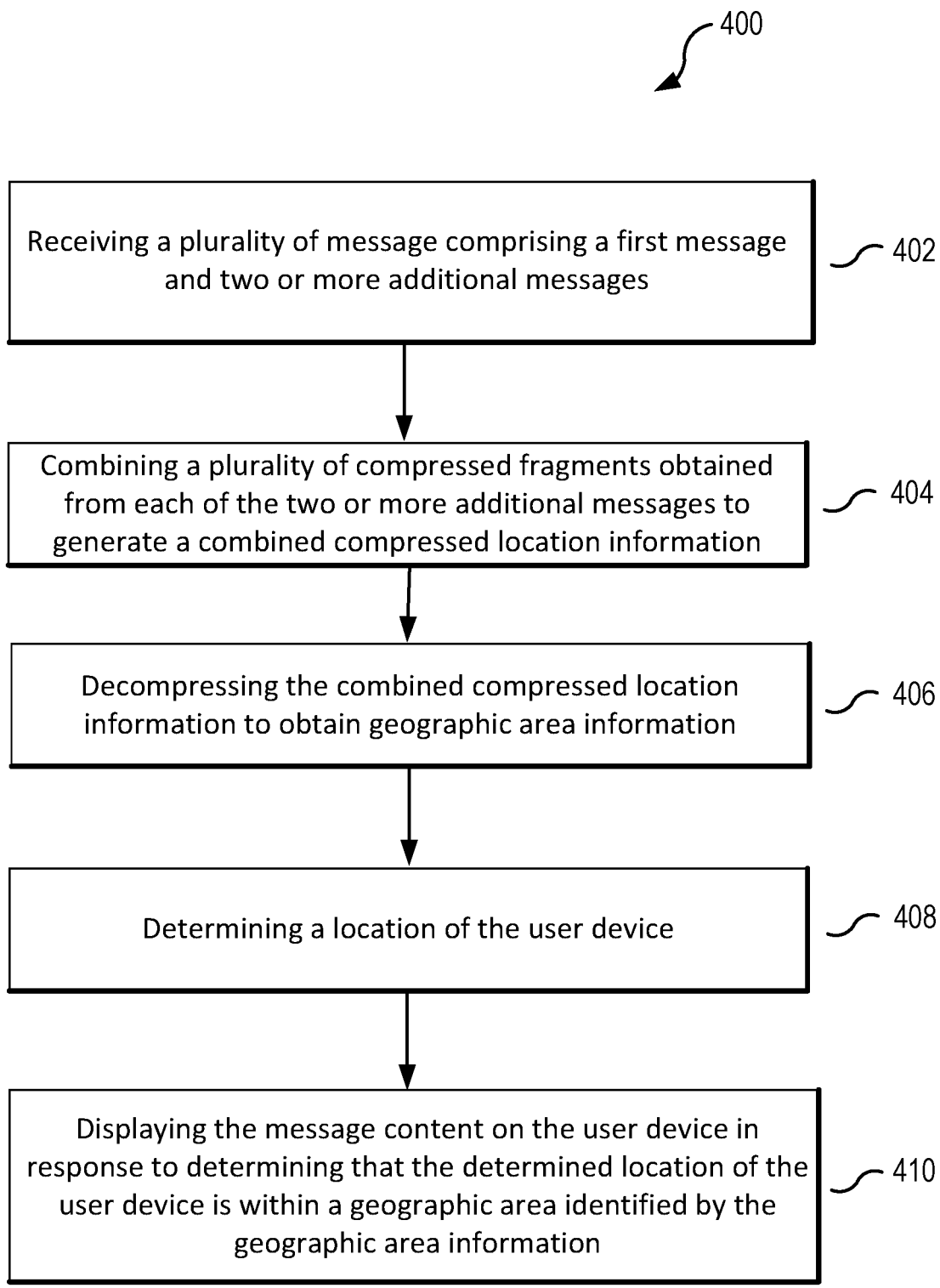
FIG. 4 shows another example of a flowchart for processing alert messaging related to an alert request.

FIG. 4 shows another example of a flowchart for processing alert messaging based on an alert request. At the receiving operation 402, a user device receives from a messaging system a plurality of messages comprising a first message and two or more additional messages. The first message includes a first payload that includes a first unique identifier and a message content, and each of the two or more additional messages includes a unique identifier and a payload that includes a fragment of compressed location information. In some embodiments, each payload of the first message and the two or more additional messages can include a same unique identifier, which can indicate to the user device that the first message and the two or more additional messages are related. The messaging system may include an emergency alert messaging system or a marketing messaging system.

At the combining operation 404, the user device can combine a plurality of fragments of the compressed location information obtained from each of the two or more additional messages to generate a combined compressed location information. At the decompressing operation 406, the user device decompresses the combined compressed location information to obtain geographic area information. At the determining operation 408, the user device determines a location of the user device. At the displaying operation 410, the user device can display on a screen the message content in response to determining that the determined location of the user device is within a geographic area identified by the geographic area information.

Figure 5:
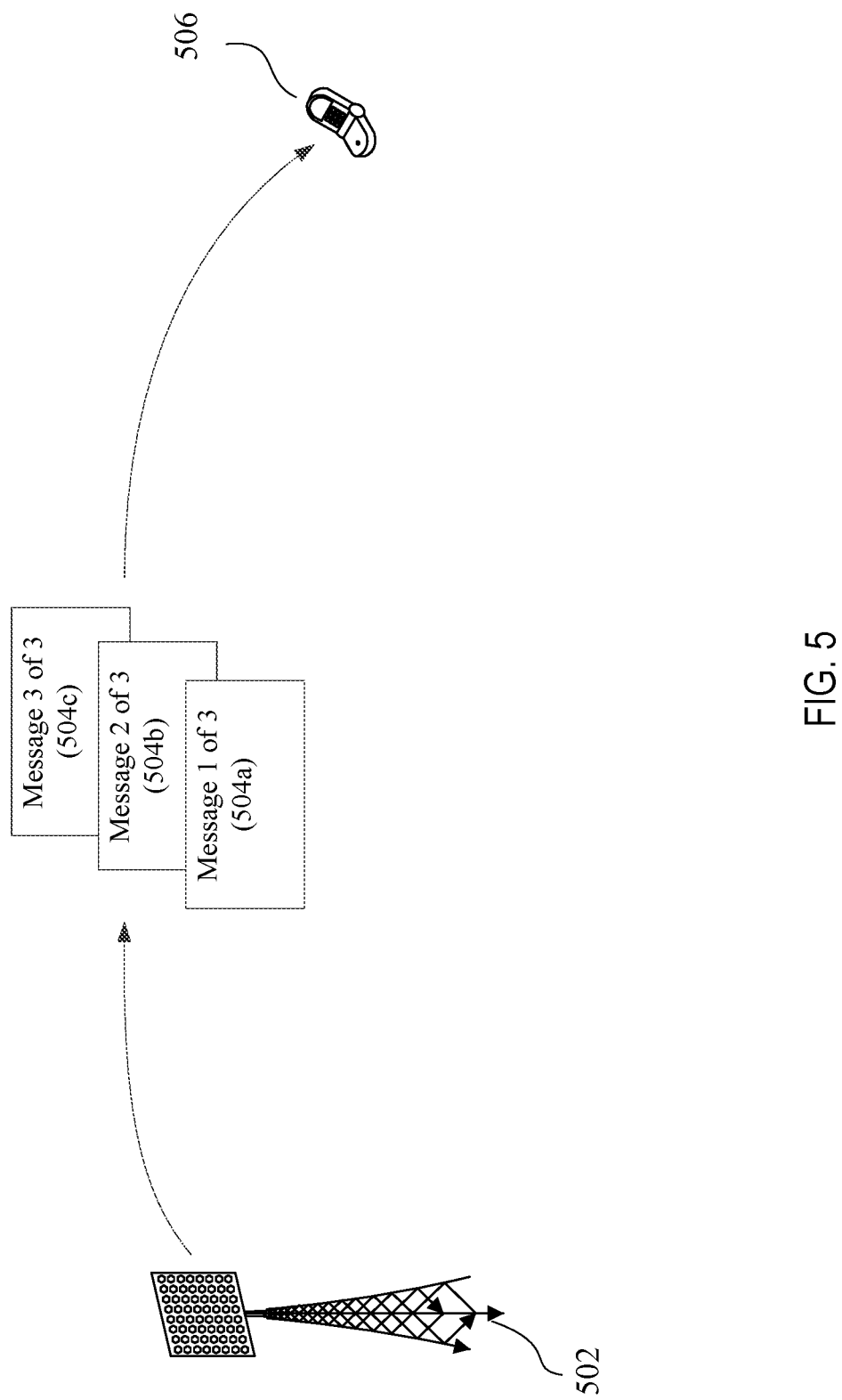
FIG. 5 shows an example of a user device receiving and reassembling alert messages.

FIG. 5 shows an example of a user device receiving and reassembling alert messages. FIG. 5 shows a user device 506 receiving a first message 504a, a second message 504b, and a third message 504c from a cellular or wireless network 502. The first, second and third messages 504a-504c can include information related to an alert request as described in this patent document. For instance, the payload of message 504a can include an identifier and a message content, the payload of each message 504b and 504c can include an identifier and a fragment of geographic area information for the message content, where the geographic area information may be compressed. In some embodiments, the geographic area information may be included in a single message, such as in a second message 504b.

The identifier included in each message 504a, 504b, and 504c may indicate a sequence of messages to indicate that the first and the second messages are related to each other or are a part of a sequence of messages. An example of an identifier for the three messages 504a-504c may be "1001 of 1003", "1002 of 1003", and "1003 of 1003," respectively. Using the techniques described in this patent document, an application running on a user device can process the information included in the three messages 504a-504c by evaluating the identifiers associated with each received message as further described below. The messages or message identifiers can be numerical or alphanumerical, and can be combined with other message identifiers.

The user device application can reassemble the received messages when the user device application determines that it has received a complete alert message. Referring to the example shown in FIG. 5, based on the identifiers of each of the three received messages 504a-504c, the user device application can determine that it has received all the messages it needs to reassemble a complete alert message. Using the example identifiers described above (e.g., "1001 of 1003"), the user device application can determine that the first value "1001" is an identifier of the first message and the next value "1003" indicates a total of three messages that form a complete alert message. Thus, even if the user device receives the second and third messages 504b-504c before the first message 504a, the user device application can sort and reassemble the messages in a correct order.

Next, the user device application can reassemble the first, second, and third messages to obtain a message content and geographic area information using the techniques described in this patent document. For instance, the user device application can determine a location of the user device. If the user device application determines that the determined location of the user device is within a geographic area identified by the geographic area information, then the user device application can display on a screen of the user device the message content.

In some embodiments, the user device application may not reassemble the received messages until the user device application determines that it has received a complete set of alert messages. The user device application can determine that it has not received one or more missing messages by checking the identifier associated with each received message. Based on the identifier(s) of the received message(s), the user device application can determine the identity/identities of the message(s) that have been received and/or the identity/identities of the missing message(s) that have not been received. For example, if the user device receives only the first and third messages 504a and 504c in FIG. 5, the user device application can determine based on the identifiers of the first and third messages 504a and 504c that the first and third messages are a part of a sequence of three messages that the user device application needs to reassemble a complete alert message. In some embodiments, the user device application can determine the identity of the second message 504b that the user device application needs to receive before it can reassemble a complete alert message.

In some cases, the user device 506 can send a message to the cellular or wireless network 502 requesting that the second message 504b be resent. The message sent by the user device may include an identifier of the second message 504b determined by the user device application. In some embodiments, a user device may send a message resend request after a pre-determined time from the time of an event. Some examples of the event includes the time when the user device receives any of the messages (e.g., first or the third messages 504a and 504c), or from the time when the user device 506 determines the identity/identities of the one or more messages (e.g., second message 504b) that has not been received by the user device 506. In some embodiments, if a user device has not received a message on a first wireless network, the user device may send a message resend request over a second or a different wireless network.

When the user device application receives the missing message(s) (e.g., second message 504b) it can combine the received messages (e.g., messages 504a-504c) to obtain a complete set of alert messages. Next, the user device application can reassemble the receives messages to obtain and to perform additional processing with a message content and geographic area information as described in this patent document.

Figure 6:
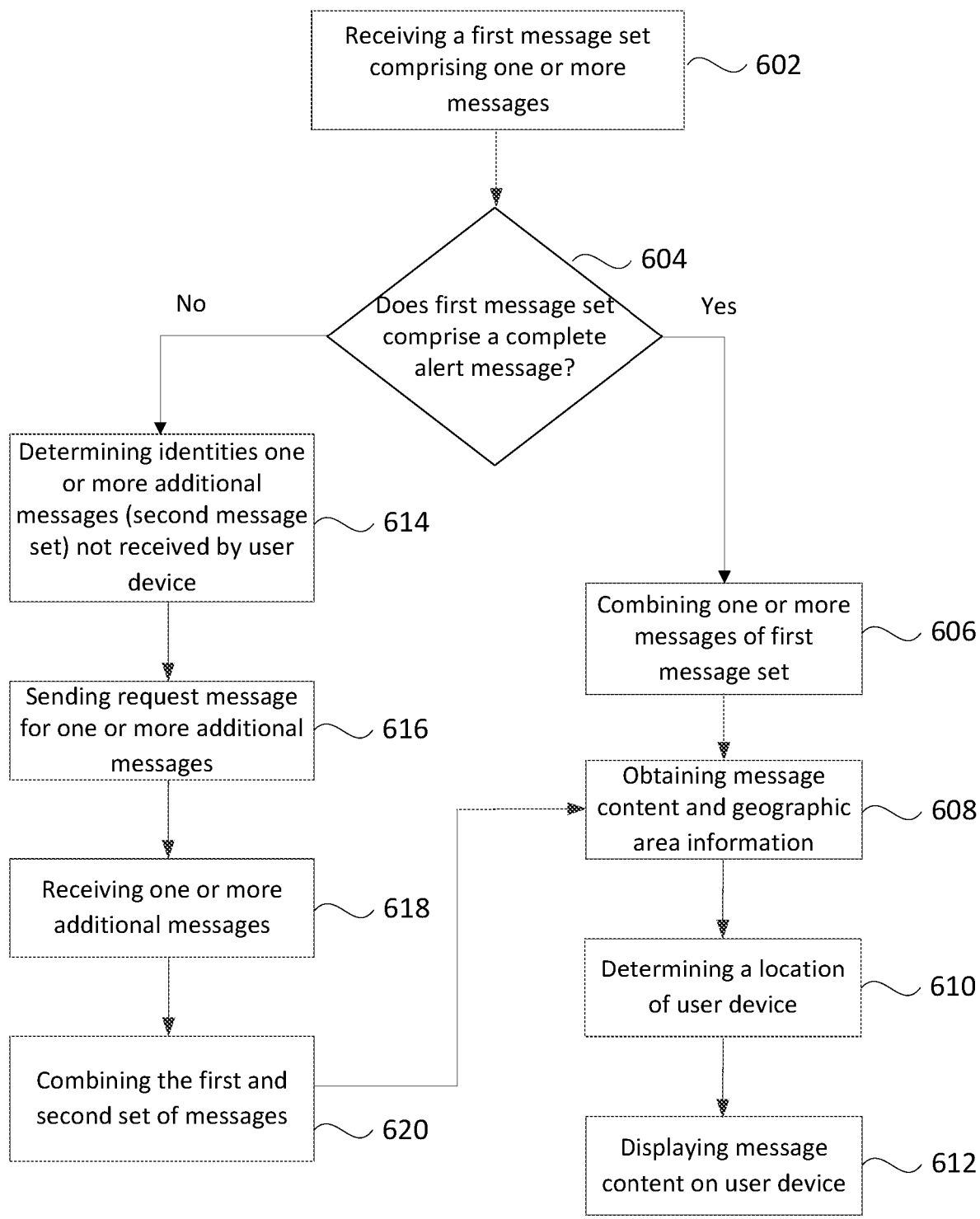
FIG. 6 shows another example of a flowchart for processing one or more alert messages based on an alert request.

FIG. 6 shows another example of a flowchart for processing one or more alert messages based on an alert request. At the receiving operation 604, a user device receives a first message set from a messaging system. The first message set comprises one or more messages, where each message comprises an identifier that indicates that each message is part of a plurality of messages that yields a complete alert message. The messaging system may include an emergency alert messaging system or a marketing messaging system.

At the determining operation 604, the user device can determine whether the first message set comprises the complete alert message based on one or more identifiers of the one or more messages. If the user device determines, based on one or more identifiers of the one or more messages, that the first message set comprises the complete alert message, then the user device can reassemble the first message set by performing the combining operation 606 and subsequent operations 608, 610, and 612 as shown in FIG. 6.

At the combining operation 606, the user device combines the one or more messages of the first message set to obtain the complete alert message. At the obtaining operation 608, the user device obtains a message content and geographic area information from the complete alert message. In some embodiments, the geographic area information includes any one or more of a polygon location information and a geocode information.

At the determining operation 610, the user device determines a location of the user device. In some embodiments, the location of the user device is determined based on any one of global positioning system (GPS) location information, network triangulation location information, Wi-Fi information, Bluetooth information, and a user input At the displaying operation 612, the user device displays the message content on the user device in response to determining that the determined location of the user device is within a geographic area identified by the geographic area information.

At the determining operation 604, if the user device determines, based on one or more identifiers of the one or more messages, that the first message set does not comprise the complete alert message, then the user device can perform the determining operation 614 and subsequent operations 616, 618, 620, 608, 610, and 612. At the determining operation 614, the user device determines identities of one or more additional messages not received by the user device. The second message set comprises the one or more additional messages needed to reassemble the complete alert message.

At the sending operation 616, the user device sends a request message a source of the first message set. The request message requests the one or more additional messages of the second message set. In some embodiments, the user device sends the request message to the source of the first message set after a pre-determined time from a time of a trigger event. In some embodiments, the trigger event includes the time when the user device receives any message of the first message set, or the time when the user device determines the identities of one or more additional messages not received by the user device.

At the receiving operation 618, the user device receives the second message set that includes the one or more additional messages. At the combining operation 620, the user device combines the first message set and the second message set to obtain the complete alert message. Next, the user device may process the complete alert message by performing operations 608, 610, and 612 as described above.

Figure 7:
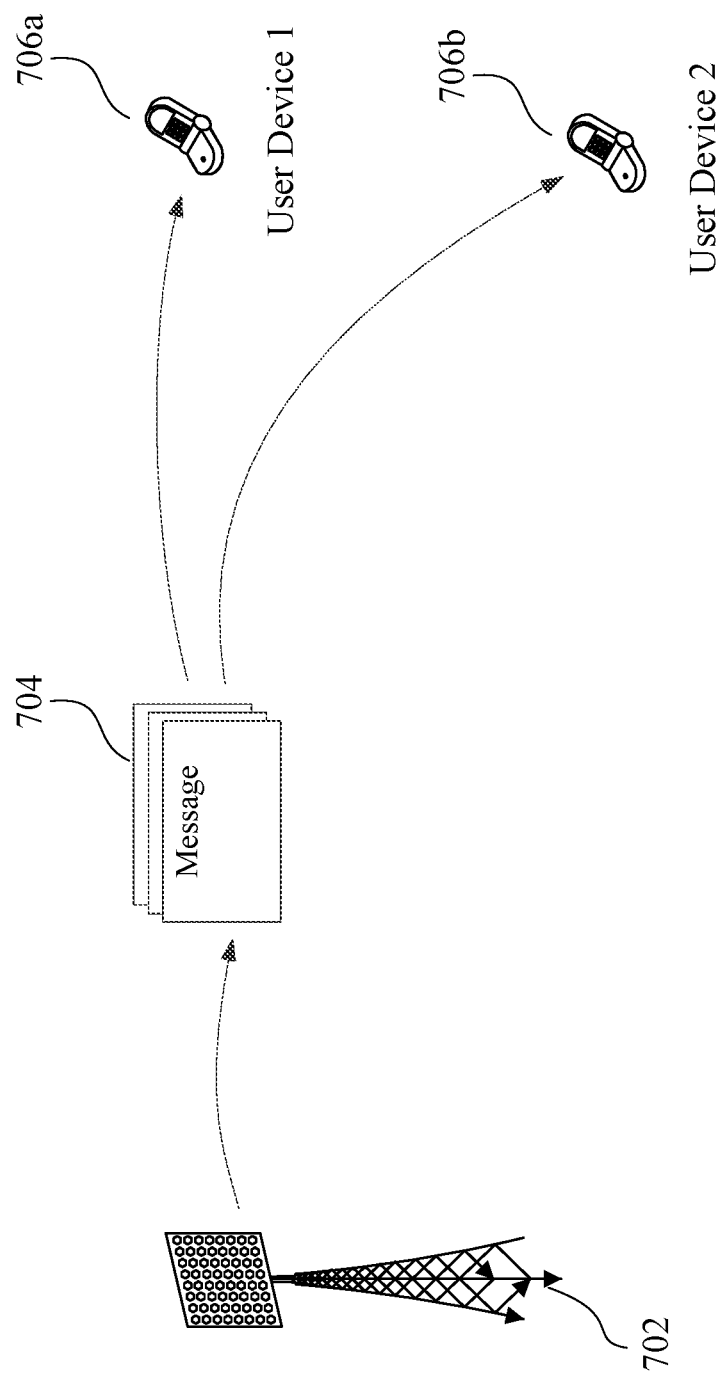
FIG. 7 shows an example a system where an alert message is targeted to one or more user devices.

FIG. 7 shows an example a system where an alert message is targeted to one or more user devices. FIG. 7 shows that the user devices 706a and 706b are located in a wireless broadcast range of the cellular or wireless network 702. Thus, the user devices 706a and 706b receive the same one or more messages 704 broadcast by the cellular or wireless network 702. The one or more messages 704 comprise a complete alert message and include information related to an alert request as described in this patent document. For instance, the payload of a first message can include an identifier with a message content, and the payload of one or more additional message can include an identifier and geographic area information for the message content, where the geographic area information may be compressed. In the example of FIG. 7, the one or more messages 704 is meant for a first user device 706a and not for the second user device 706b. As further described below, a user device application can use the identifier(s) of the one or more messages or a cryptographic technique to determine whether the user device is a permitted recipient of the one or more messages.

An identifier server (not shown in FIG. 7) may assign and send to each user device an identifier, such as a unique code, a digital token, or a decryption key. The identifier may identify each user device or it may identify a group of one or more user devices. In some embodiments, a user device may be associated with two or more identifiers where a first identifier may uniquely identify the user device and the second identifier may identify the group of one or more user devices to which the user device belongs. The identifier may be sent to the user devices when the user devices download an application that processes the one or more messages 704, or when a user joins a group of one or more user devices or the identifier may be periodically changed by the identifier server and may be pushed to the application on the user devices. The identifier server can store in a database the identifier(s) associated with each user device. The identifier server, the database, and the messaging server 106 (described in FIG. 1) may communicate with each other using, for example, the Internet or Intranet. In some embodiments, the identifier server may be the same as the messaging server 106.

The messaging server 106 may generate the one or more messages 704 by obtaining from the database an identifier assigned to or corresponding to a target (e.g., user device 706a) of the one or more messages 704. In some embodiments as further discussed below, the one or more messages 704 may be generated by including in each message an identifier associated with the target device(s) so that only the target device(s) may further process the message(s) 704. In some embodiments as further described below, the messaging server 106 may encrypt the one or more messages 704 using a cryptographic key associated with the target device(s) so that only the target device(s) may decrypt and further process the one or more messages 704.

In FIG. 7, user devices 706a and 706b can receive the same one or more messages 704. Thus, each user device 706a and 706b can process the one or more messages to determine whether the user device is the target of the one or more messages 704. In some embodiments, the user devices may compare the identifiers received in each message to the identifier associated with and stored in the user device. For example, if the unique code or information associated with a digital token in each message 704 is the same as the identifier (e.g., a unique code or digital token) stored in the user device, then the user device further processes the message to obtain the message content and the geographic area information using the techniques described in this patent document.

In another example, the messaging server 106 may encrypt the one or more messages 704 with an encryption key associated with one or more user devices that are the recipient(s) of the one or more messages 704. For example, a messaging server (or another server) may retrieve from a database an encryption key associated with the permitted recipients (e.g., one or more user devices) of the one or more messages 704. The messaging server (or another server) may encrypt the one or more messages 704 with the retrieved encryption key and then send the message(s) via a cellular or wireless network as described in this patent document. In some embodiments, the one or more encrypted messages may include a tag or a message authentication code (MAC) that can be used by the user device to authenticate the one or more messages as further explained below.

The permitted recipients of the one or more messages 704 possess a decryption key that corresponds to the encryption key used to encrypt the one or more messages 704. As mentioned above, a user device may obtain its decryption key from an identifier server at a time prior to receiving the one or more messages 704, for example, when a user device downloads an application that processes the one or more messages 704, or when a user joins a group of one or more user devices, or when a server periodically updates and sends the decryption key.

When a user device receives the one or more encrypted messages 704, the user devices 706a and 706b can use its respective decryption key to decrypt each received message 704. Next, the user devices 706a and 706b can authenticate the one or more decrypted messages using, for example, the MAC or the tag that may be included in the one or more decrypted messages. Based on the authentication of the messages, the first user device 706a can determine that it is a permitted recipient of the one or more messages 704. For example, a first user device 706a can determine that it is a permitted recipient if the first user device 706a obtains the MAC or the tag from a decrypted message that has (i) a value associated with a permitted recipient or (ii) information or bits computed by the first user device 706a to have a value associated with a permitted recipient. Next, as further described in this patent document, the user device 706a can process the one or more decrypted messages to obtain and display a message content by comparing a location of the user device 706a with the geographic area information included in the one or more decrypted messages.

By contrast, when the second user device 706b uses its decryption key to decrypt the one or more messages 704, it determines, based on the authentication of the one or more decrypted messages, that the second user device 706b is not a permitted recipient of the one or more decrypted messages. For example, the second user device 706b can determine that it is not a permitted recipient if the second user device 706b obtains the MAC or the tag from a decrypted message that has (i) a value associated with an unpermitted recipient or (ii) information or bits computed by the second user device 706b to have a value associated with an unpermitted recipient. As a result, the second user device 706b may determine that the message content included in the one or more decrypted messages should not be displayed on a display of the second user device 706b, or the second user device 706b may discard or ignore the one or more decrypted messages.

In some embodiments, the messaging server 106 may encrypt the one or more messages 704 using a target user device(s)'s public cryptographic key that can be obtained from a database. In some embodiments, the user devices may send their public cryptographic keys to the identifier server that that store the public cryptographic key information for each user device in the database. The messaging server 106 may obtain the public cryptographic key of the target user device from the database. In the example of FIG. 7, the encrypted one or more messages 704 is broadcast to the user devices 706a and 706b. Both user devices 706a and 706b can use their respective private cryptographic keys to decrypt each received message 704, and can further process the messages as described above.

Figure 8:
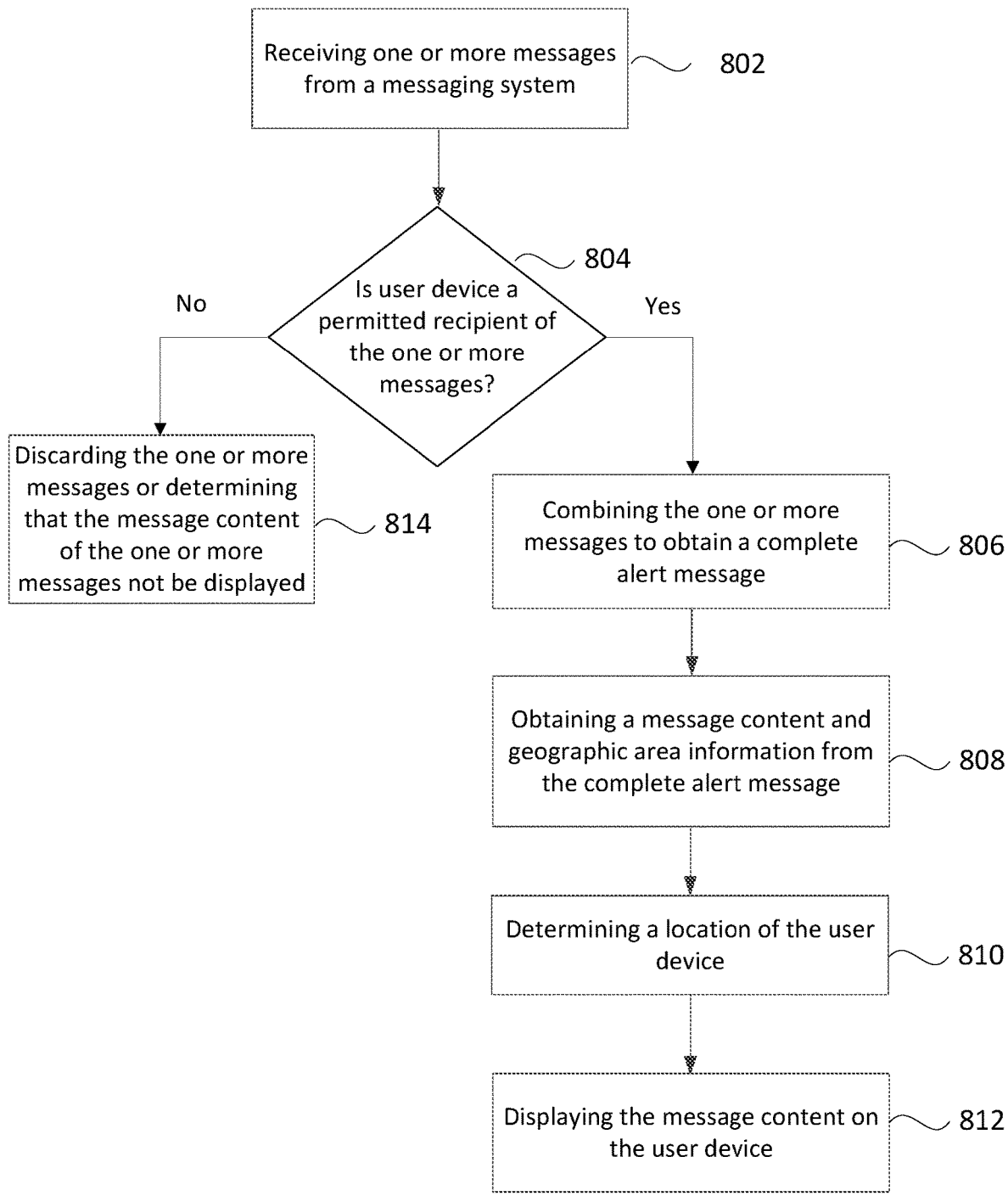
FIG. 8 shows another example of a flowchart for processing one or more alert messages based on an alert request.

FIG. 8 shows another example of a flowchart for processing one or more alert messages based on an alert request. At the receiving operation 802, a user device receives one or more messages from a messaging system. Each of the one or more messages includes an identifier. In some embodiments, the one or more identifiers of the one or more messages include a unique code, or information associated with a digital token. The messaging system may include an emergency alert messaging system or a marketing messaging system.

At the determining operation 804, the user device can determine whether the user device is a permitted recipient of the one or more messages based on one or more identifiers of the one or more messages. If the user device determines, based on one or more identifiers of the one or more messages, that the user device is a permitted recipient of the one or more messages, then the user device performs the combining operation 806. In some embodiments, the user device can determine that it is a permitted recipient by determining that the one or more identifiers of the one or more messages are the same as an identifier of the user device.

At the combining operation 806, the user device combines the one or more messages to obtain a complete alert message. At the obtaining operation 808, the user device obtains a message content and geographic area information from the complete alert message. In some embodiments, the geographic area information includes any one or more of a polygon location information and a geocode information.

At the determining operation 810, the user device determines a location of the user device. In some embodiments, the location of the user device is determined based on any one of global positioning system (GPS) location information, network triangulation location information, Wi-Fi information, Bluetooth information, and a user input.

At the displaying operation 812, the user device displays the message content on the user device in response to determining that the determined location of the user device is within a geographic area identified by the geographic area information.

At the determining operation 804, if the user device determines, based on one or more identifiers of the one or more messages, that the user device is not the permitted recipient of the one or more messages, then the user device may discard the one or more messages, or determine that the message content of the one or more messages not be displayed. In some embodiments, the user device determines that it is not a permitted recipient by determining that the one or more identifiers of the one or more messages are different from an identifier of the user device.

Figure 9:
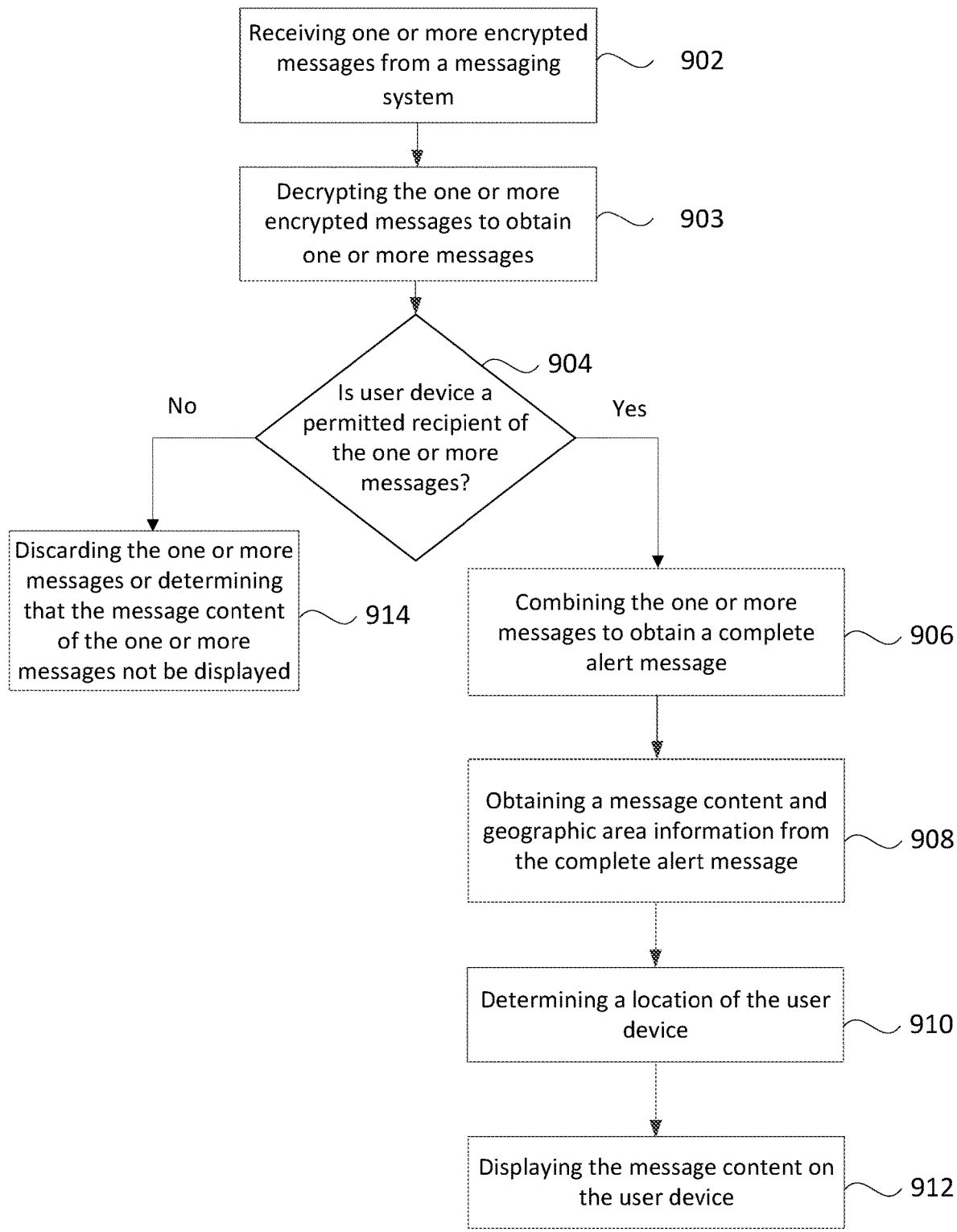
FIG. 9 shows an example of a flowchart for processing one or more encrypted alert messages based on an alert request.

FIG. 9 shows an example of a flowchart for processing one or more encrypted alert messages based on an alert request. At the receiving operation 902, a user device receives one or more encrypted messages from a messaging system. At the decrypting operation 903, the user device decrypts, using a cryptographic key of the user device, the one or more encrypted messages to obtain one or more messages. In some embodiments, the user device receives the cryptographic key prior to receiving the one or more encrypted messages from the messaging system. The messaging system may include an emergency alert messaging system or a marketing messaging system.

At the determining operation 904, the user device determines whether the user device is a permitted recipient of the one or more messages based on an authentication of the one or more messages. If the user device determines, based on an authentication of the one or more messages, that the user device is a permitted recipient of the one or more messages, then the user device can perform the combining operation 906, described below. The user device determines that it is a permitted recipient by authenticating the one or more messages. For example, the user device authenticates the one or more messages by obtaining a message authentication code (MAC) or a tag from the one or more messages, and by performing any one of: (i) determining a first value of the MAC or the tag to be associated with the permitted recipient of the one or more messages, or (ii) computing a second value from the MAC or the tag to be associated with the permitted recipient of the one or more messages. The user device determines that it is a permitted recipient by determining that the first value or the second value are associated with the permitted recipient of the one or more messages.

At the combining operation 906, the user device combines the one or more messages to obtain a complete alert message. At the obtaining message 908, the user device obtains a message content and geographic area information from the complete alert message. In some embodiments, the geographic area information includes any one or more of a polygon location information and a geocode information.

At the determining operation 910, the user device determines a location of the user device. In some embodiments, the location of the user device is determined based on any one of global positioning system (GPS) location information, network triangulation location information, Wi-Fi information, Bluetooth information, and a user input.

At the displaying operation 912, the user device displays the message content on the user device in response to determining that the determined location of the user device is within a geographic area identified by the geographic area information.

At the determining operation 904, if the user device determines, based on the authentication of the one or more messages, that the user device is not the permitted recipient, then the user device discards the one or more messages, or determines that the message content of the one or more messages not be displayed. The user device determines that it is not the permitted recipient by authenticating the one or more messages. The user device authenticates the one or more messages by obtaining a message authentication code (MAC) or a tag from the one or more messages, and by performing any one of: (i) determining a first value of the MAC or the tag to be associated with the permitted recipient of the one or more messages, or (ii) computing a second value from the MAC or the tag to be associated with the permitted recipient of the one or more messages. The user device determines that it is not a permitted recipient by determining that the first value or the second value are not associated with the permitted recipient of the one or more messages.

The location based messaging service described in this patent document can have a wide range of applications. For example, the exemplary location based messaging services can be used to provide information about imminent threats, AMBER alerts, presidential alerts, marketing, GPS maps, Internet of Things (IoT), Emergency Alert System (EAS), Wireless Emergency Alerts (WEA), the National Oceanic and Atmospheric Administration (NOAA) Weather Radio, Navy Wide Area Alert Network (WAAN), Automated Telephone Notification System (ATNS), or Computer Desktop Notification System (CDNS).

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described for FIGS. 1 to 9, and/or in the various embodiments described in this patent document.

Figure 10:
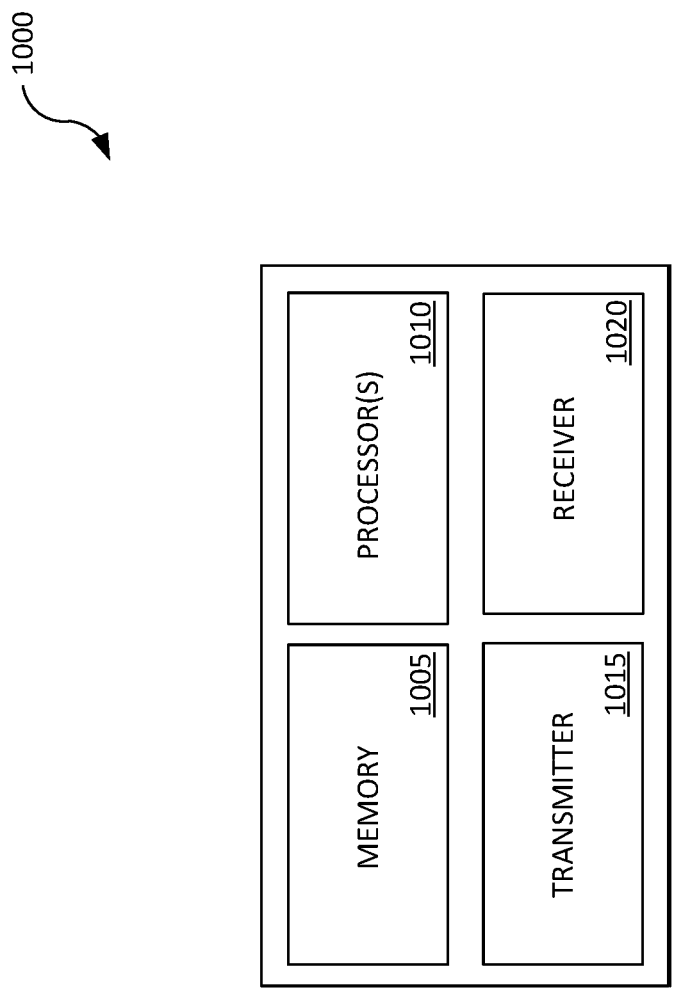
FIG. 10 shows an exemplary block diagram of a hardware platform to implement the techniques described in this patent document.

FIG. 10 shows an exemplary block diagram of a hardware platform 1000 that may be a part of a server (e.g., messaging server) or a user equipment. The hardware platform 1000 includes at least one processor 1010 and a memory 1005 having instructions stored thereupon. The instructions upon execution by the processor 1010 configure the hardware platform 1000 to perform the operations described in any one or more of FIGS. 1 to 9 and/or in the various embodiments described in this patent document. The transmitter 1015 transmits or sends information or data to another device. For example, a messaging server transmitter can send messages to a one or more CBCs to send the messages to the user equipment using the techniques described in this patent document. The receiver 1020 receives information or data transmitted or sent by another device. For example, a user equipment can receive and process the plurality of messages sent by a messaging server using the techniques described in this patent document.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is what is described and illustrated, including:

1. A method of generating alert messaging, comprising:
   receiving an alert request that includes a message content and geographic area information;
   compressing the geographic area information to obtain compressed location information;
   generating, by separating information included in the alert request, a plurality of messages comprising at least a first message and a second message, wherein the first message includes a first payload that includes a first unique identifier and the message content, the second message includes a second payload that includes a second unique identifier and at least a portion of the compressed location information, and the first unique identifier and the second unique identifier facilitate a reassembling of the first message and the second message by a user device; and transmitting the plurality of messages to be broadcast to a plurality of user devices.

2. The method of claim 1, wherein each of the first and second messages include a value representing a number of messages in the plurality of messages.

3. The method of claim 1, further comprising:

determining that a length of the compressed location information is greater than a length of the second payload;

generating two or more fragments of the compressed location information;

generating one or more additional messages, wherein
each payload of each additional message includes a unique identifier, and
the two or more fragments of the compressed location information are included in the second payload of the second message and in each payload of the one or more additional messages.

4. The method of claim 3, wherein the unique identifier of each additional message is a same identifier as the first unique identifier and the second unique identifier.

5. The method of claim 3, wherein each of the one or more additional messages include a value that represents a total number of messages.

6. The method of claim 3, wherein the length of the second payload is 90 characters or 360 characters.

7. The method of claim 1, wherein the geographic area information includes any one or more of a polygon location information and a geocode information.

8. A method of processing alert messaging, comprising:

receiving, by a user device from a messaging system, a plurality of messages comprising a first message and a second message, wherein
the first message includes a first payload that includes a first unique identifier and a message content, and
the second message includes a second payload that includes a second unique identifier and compressed location information;

decompressing the compressed location information to obtain geographic area information;

determining a location of the user device; and displaying the message content on the user device in response to determining that the determined location of the user device is within a geographic area identified by the geographic area information.

9. The method of claim 8, wherein the first unique identifier is a same identifier as the second unique identifier.

10. The method of claim 8, wherein the location of the user device is determined based on any one of global positioning system (GPS) location information, network triangulation location information, Wi-Fi information, Bluetooth information, and a user input.

11. The method of claim 8, wherein the geographic area information includes any one or more of a polygon location information and a geocode information.

12. An apparatus for generating alert messaging, comprising a memory and a processor, wherein the processor reads code from the memory and implements a method comprising:

receiving an alert request that includes a message content and geographic area information;

compressing the geographic area information to obtain compressed location information;

generating, by separating information included in the alert request, a plurality of messages comprising at least a first message and a second message, wherein
the first message includes a first payload that includes a first unique identifier and the message content,
the second message includes a second payload that includes a second unique identifier and at least a portion of the compressed location information, and
the first unique identifier and the second unique identifier facilitate a reassembling of the first message and the second message by a user device; and transmitting the plurality of messages to be broadcast to a plurality of user devices.

13. The apparatus of claim 12, wherein each of the first and second messages include a value representing a number of messages in the plurality of messages.

14. The apparatus of claim 12, wherein the method further comprises:

determining that a length of the compressed location information is greater than a length of the second payload;

generating two or more fragments of the compressed location information;

generating one or more additional messages, wherein
each payload of each additional message includes a unique identifier, and
the two or more fragments of the compressed location information are included in the second payload of the second message and in each payload of the one or more additional messages.

15. The apparatus of claim 14, wherein the unique identifier of each additional message is a same identifier as the first unique identifier and the second unique identifier.

16. The apparatus of claim 14, wherein each of the one or more additional messages include a value that represents a total number of messages.

17. The apparatus of claim 14, wherein the length of the second payload is 90 characters or 360 characters.

18. The apparatus of claim 12, wherein the geographic area information includes any one or more of a polygon location information and a geocode information.

19. An apparatus for processing alert messaging, comprising a memory and a processor, wherein the processor reads code from the memory and implements a method comprising:

receiving, by a user device from a messaging system, a plurality of messages comprising a first message and a second message, wherein
the first message includes a first payload that includes a first unique identifier and a message content, and
the second message includes a second payload that includes a second unique identifier and compressed location information;

decompressing the compressed location information to obtain geographic area information;

determining a location of the user device; and displaying the message content on the user device in response to determining that the determined location of the user device is within a geographic area identified by the geographic area information.

20. The apparatus of claim 19, wherein the first unique identifier is a same identifier as the second unique identifier.

21. The apparatus of claim 19, wherein the location of the user device is determined based on any one of global positioning system (GPS) location information, network triangulation location information, Wi-Fi information, Bluetooth information, and a user input.

22. The apparatus of claim 19, wherein the geographic area information includes any one or more of a polygon location information and a geocode information.

\* \* \* \* \*